United States Patent
Wu

(10) Patent No.: US 8,964,118 B2
(45) Date of Patent: Feb. 24, 2015

(54) DISPLAY SIGNAL PROCESSING SYSTEM, CIRCUIT BOARD, AND LIQUID CRYSTAL DISPLAY

(71) Applicant: Shenzhen China Star Optoelectronics Technology Co., Ltd., Shenzhen, Guangdong (CN)

(72) Inventor: Dongguang Wu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 36 days.

(21) Appl. No.: 13/884,290

(22) PCT Filed: Apr. 18, 2013

(86) PCT No.: PCT/CN2013/074331
§ 371 (c)(1),
(2) Date: May 9, 2013

(87) PCT Pub. No.: WO2014/166126
PCT Pub. Date: Oct. 16, 2014

(65) Prior Publication Data
US 2014/0307163 A1 Oct. 16, 2014

(30) Foreign Application Priority Data
Apr. 12, 2013 (CN) .......................... 2013 1 0127928

(51) Int. Cl.
*H04N 7/01* (2006.01)
*H04N 11/20* (2006.01)
*H04N 5/04* (2006.01)
*H04N 9/44* (2006.01)

(52) U.S. Cl.
CPC ...................................... *H04N 7/01* (2013.01)
USPC ........... 348/455; 348/441; 348/453; 348/501; 348/502

(58) Field of Classification Search
USPC ....................................................... 348/441
See application file for complete search history.

(56) References Cited

U.S. PATENT DOCUMENTS

2002/0122046 A1\* 9/2002 Dischert et al. ............... 345/629
2002/0140651 A1\* 10/2002 Lim et al. ........................ 345/87
2012/0014080 A1\* 1/2012 Feng et al. ..................... 361/784

\* cited by examiner

*Primary Examiner* — Jefferey Harold
*Assistant Examiner* — Michael Teitelbaum
(74) *Attorney, Agent, or Firm* — Andrew C. Cheng

(57) ABSTRACT

A display signal processing system, a circuit board, and a liquid crystal display are disclosed. The display signal processing system includes an image processing circuit and a V-by-One circuit capable of selecting a JEIDA mode and a VESA mode. A GPIO of the V-by-One circuit is for selectively inputting a first or a second selection signal such that the V-by-One circuit transforms the converted display signal to be a first LVDS signal under the JEIDA mode or a second LVDS under the VESA mode. The first LVDS or second LVDS signal is output by a signal output. The selection between the VESA mode and the JEIDA may be achieved by a simplified V-by-One circuit. In addition, the display signal processing system retains the advantage of lower cost and simple operations.

10 Claims, 4 Drawing Sheets

DISPLAY SIGNAL PROCESSING SYSTEM, CIRCUIT BOARD, AND LIQUID CRYSTAL DISPLAY

BACKGROUND OF THE INVENTION

1. Field of the Invention

Embodiments of the present disclosure relate to transmission technology for communication interfaces, and more particularly to a display signal processing system, a circuit board, and a liquid crystal display.

2. Discussion of the Related Art

With advantages of high-speed, low power consumption, and low electromagnetic radiation, the Low Voltage Differential Signaling (LVDS) signals are adopted to transmit a large amount data between a display panel and a display signal processing system in high frequency.

FIG. 1 is a block diagram showing a typical display signal processing system. As shown, a V-by-One circuit 120 is adopted to obtain the LVDS signal. An image processing circuit 110 obtains the converted display signals from a signal source, and the V-by-One circuit 120 transforms the display signals to corresponding LVDS signals.

As the LVDS signals are serially transmitted and the display signals to be transmitted to the liquid crystal display include parallel image signals and control signals, the serially transmitted data has to be converted to he parallel data. In addition, as the pixel mapping sequences are different for transmission and reception, there are Japan Electronic Industry Development Association (JEIDA) and Video Electronics Standards Association (VESA) modes. JEIDA mode is the default mode of the V-by-One circuit 120. When there is a need to switch to the VESA mode, the image processing circuit 110 has to alter the driving capability, i.e., from high to low, by the I2C bus 130 so as to change the sequence of data mapping. The operation of such circuit is complex and the cost is relatively high.

In view of the above, there is a need to provide a display signal processing system, a circuit board, and a liquid crystal display to overcome the above problems.

SUMMARY

In one aspect, a display signal processing system includes: a V-by-One circuit capable of selecting a JEIDA mode and a VESA mode; an image processing circuit for converting a format of display signals from a signal source, and for outputting the converted display signals to the V-by-One circuit; and the V-by-One circuit comprises a signal input for connecting the image processing circuit to input the converted display signals, a signal output, and a GPIO for selectively inputting a first or a second selection signal such that the V-by-One circuit transforms the converted display signal to be a first LVDS signal under the JEIDA mode or a second LVDS under the VESA mode, and then the first LVDS or second LVDS signal is output by the signal output.

Wherein the first selection signal and the second selection signal are voltage signals, and the voltage of the first selection signal is higher than the voltage of the second selection signal.

Wherein the system further comprises a first resistor and a second resistor, a first end of the first resistor is grounded, a second end of the first resistor connects to a first end of the second resistor and the GPIO, a second end of the second resistor connects to a power source such that the GPIO is controlled by the power source to generate the first or the second selection signal.

Wherein the V-by-One circuit, the first resistor, and the second resistor are arranged on the same printed circuit board (PCB).

Wherein the signal input of the V-by-One circuit connects to an I2C bus of the image processing circuit.

In another aspect, a circuit board includes: a V-by-One chip capable of selecting a JEIDA mode and a VESA mode, the V-by-One circuit comprises a signal input for connecting the image processing circuit to input converted display signals, a signal output, and a GPIO for selectively inputting a first or a second selection signal such that the V-by-One circuit transforms the converted display signal to be a first LVDS signal under the JEIDA mode or a second LVDS under the VESA mode, and then the first LVDS or second LVDS signal are output by the signal output.

Wherein the first selection signal and the second selection signal are voltage signals, and the voltage of the first selection signal is higher than the voltage of the second selection signal.

Wherein the circuit board further comprises a first resistor and a second resistor, a first end of the first resistor is grounded, a second end of the first resistor connects to a first end of the second resistor and the GPIO, a second end of the second resistor connects to a power source such that the GPIO is controlled by the power source to generate the first or the second selection signal.

In another aspect, a liquid crystal display includes: a display panel, a timing control circuit, a V-by-One circuit, and an image processing circuit assembled in turn, the V-by-One circuit is a display signal processing circuit capable of selecting JEIDA mode and a VESA mode, and the image processing circuit converts a format of display signals from a signal source, and outputs the converted display signals to the V-by-One circuit; and the V-by-One circuit comprises a signal input for connecting the image processing circuit to input the converted display signals, a signal output, and a GPIO for selectively inputting a first or a second selection signal such that the V-by-One circuit transforms the converted display signal to be a first LVDS signal under the JEIDA mode or a second LVDS under the VESA mode, and then the first LVDS or second LVDS signal are output by the signal output.

Wherein the first selection signal and the second selection signal are voltage signals, and the voltage of the first selection signal is higher than the voltage of the second selection signal; and the display signal processing circuit further comprises a first resistor and a second resistor, a first end of the first resistor is grounded, a second end of the first resistor connects to a first end of the second resistor and the GPIO, a second end of the second resistor connects to a power source such that the GPIO is controlled by the power source to generate the first or the second selection signal.

Wherein the V-by-One circuit, the first resistor, and the second resistor arc arranged on the same PCB, and the image processing circuit is arranged on another PCB.

Wherein the display panel further comprises a driving circuit connecting to the timing control circuit, and the driving circuit receives the first or the second LVDS signal from the timing control circuit so as to drive the display panel to display corresponding images.

Wherein the signal input of the V-by-One circuit connects to an I2C bus of the image processing circuit.

DETAILED DESCRIPTION OF THE EMBODIMENTS

Embodiments of the invention will now be described more fully hereinafter with reference to the accompanying drawings, in which embodiments of the invention are shown.

Figure 1:
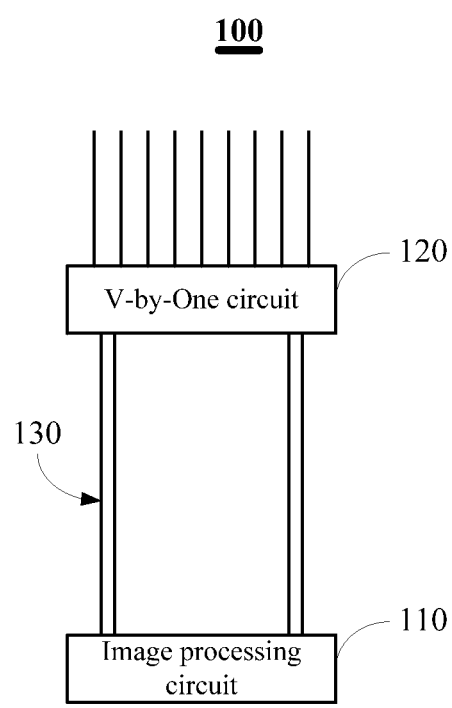
FIG. 1 is a block diagram showing a typical display signal processing system.
Figure 2:
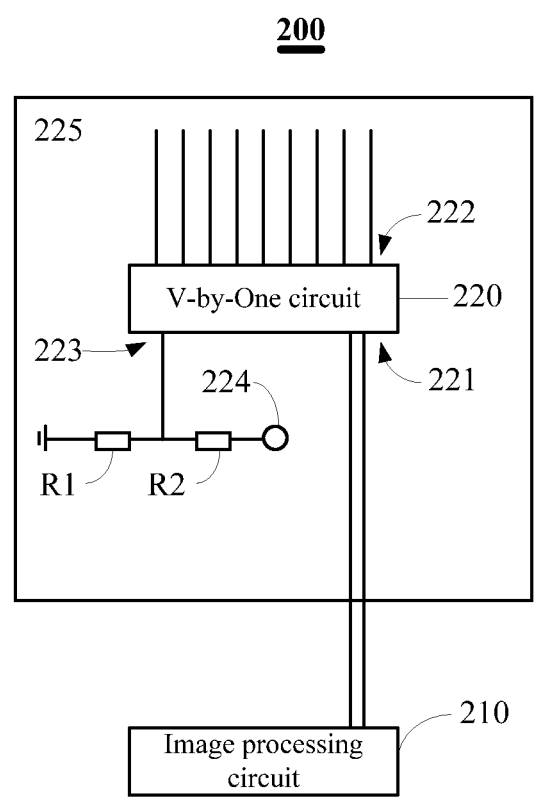
FIG. 2 is a block diagram shown in a display signal processing system in accordance with one embodiment.

FIG. 2 is a block diagram showing as display signal processing system in accordance with one embodiment. The display signal processing system 200 includes an image processing circuit 210, a V-by-One circuit 220 capable of selecting a JEIDA mode and a VESA mode.

The V-by-One circuit 220 includes a signal input 221, a signal output 222 and a GPIO 223. The GPIO 223 electrically connects to a first resistor (R1) and as second resistor (R2). A first end of the first resistor (R1) is grounded. A second end of the first resistor (R1) connects to a first end of the second resistor (R2) and the GPIO 223. A second end of the second resistor (R2) connects to a power source 224. The power source 224 may be an external power source, or a power source arranged on a circuit board 225 of the display signal processing system 200. It is to be noted that the first resistor (R1), the second resistor (R2) and the V-by-One circuit 220 are arranged on the same circuit board 225.

In the embodiment, the image processing circuit 210 converts a format of the display signals from a signal source, and outputs the converted display signals to the V-by-One circuit 220.

The signal input 221 of the V-by-One circuit 220 connects to be image processing circuit 210 to input the converted display signals.

When a first LVDS signal has to be output by the V-by-One circuit 220 under the JEIDA mode, the GPIO 223 enters an input state. The display signal processing system 200 controls the power source 224 such that the GPIO 223 is controlled by the power source 224 to generate a first selection signal. Under the circumstance, the output current is increased and the high potential is connected so that the GPIO 223 is a pullup resistor. At this moment, as being driven by the pullup resistor of the GPIO 223, the V-by-One circuit 220 further converts the display signals to be the first LVDS signal. Afterward, the first LVDS signal is output via the signal output 222 so that the display panel is capable of receiving and displaying the images.

When a second LVDS signal has to be output by the V-by-One circuit 220 under the VESA mode, the GPIO 223 enters the input state. The display signal processing system 200 controls the power source 224 such that the GPIO 223 is controlled by the power source 224 to generate a second selection signal. Under the circumstance, the output current is decreased and a low potential is connected so that the GPIO 223 is a pulldown resistor. At this moment, as being driven by the pulldown resistor of the GPIO 223, the V-by-One circuit 220 further converts the display signals to he the second LVDS signal. Afterward, the first LVDS signal is output via the signal output 222 so that the display panel is capable of receiving and displaying the images.

In the embodiment, the first selection signal and the second selection signal are voltage signals. In addition, the voltage of the first selection signal is higher than the voltage of the second selection signal. In other embodiment, the first selection signal and the second selection signal are a power signal or a current output signal. Correspondingly, the magnitude of the power or the current value of the first selection signal is larger than that of the second selection signal.

In view of the above, the display signal processing system 200 not only simplifies the selection of the VESA and the JEIDA mode of the V-by-One circuit 220, but also retains the advantages of lower cost and simple operations.

Figure 3:
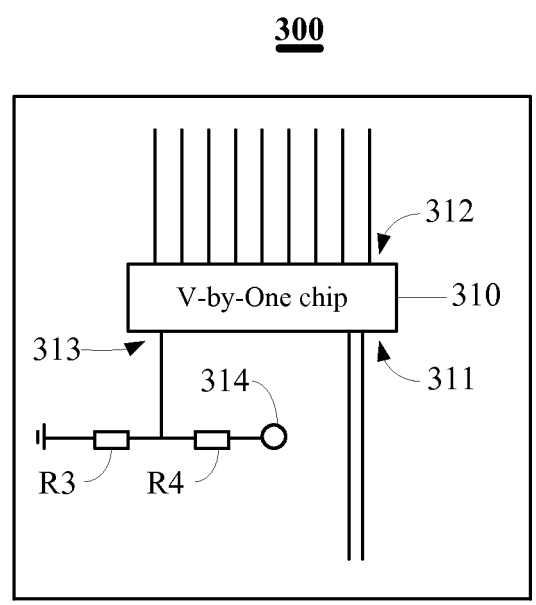
FIG. 3 is a block diagram of the circuit hoard in accordance with one embodiment.

FIG. 3 is a block diagram of the circuit board in accordance with one embodiment. The circuit board 300 includes a V-by-One chip 310 capable of selecting the JEIDA mode and the VESA mode.

The V-by-One chip 310 includes a signal input 311, a signal output 312, and a GPIO 313. In addition, the GPIO 313 electrically connects to a first resistor (R3) and a second resistor (R4). A first end of the first resistor (R3) is grounded. A second end of the first resistor (R3) connects to a first end of the second resistor (R4) and the GPIO 313. A second end of the second resistor (R4) connects to the power source 314.

In the embodiment, the GPIO 313 connects to the image processing circuit. The GPIO 313 is controlled by the power source 314 to selectively input the first selection signal such that the V-by-One chip 310 obtains the first LDS signal under the JEIDA mode. The first LVDS signal is then output by the signal output 312. Alternatively, the GPIO 313 is controlled by the power source 314 to selectively input the second selection signal such that the V-by-One chip 310 obtains the second LVDS signal under the VESA mode. The second LVDS signal is then output by the signal output 312.

In the embodiment, the first selection signal and the second selection signal are voltage signals. In addition, the voltage of the first selection signal is higher than the voltage of the second selection signal. In other embodiment, the first selection signal and the second selection signal are the power signal or the current output signal. Correspondingly, the magnitude of power or the current value of the first selection signal is larger than that of the second selection signal.

Figure 4:
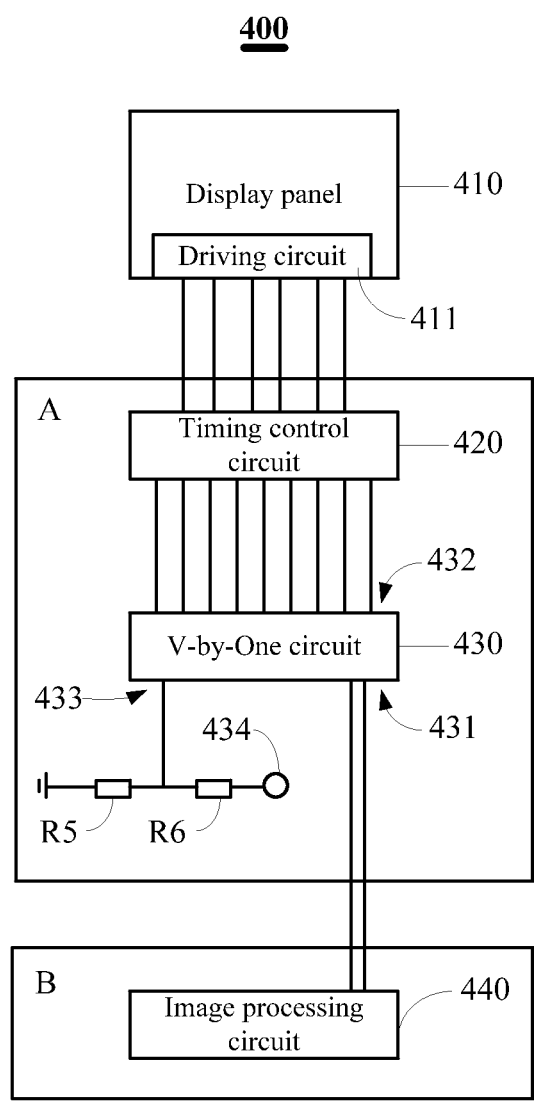
FIG. 4 is a schematic view of the liquid crystal display in accordance with one embodiment.

FIG. 4 is a schematic view of the liquid crystal display in accordance with one embodiment. The liquid crystal display 400 includes a display panel 410, a timing control circuit 420, as V-by-One circuit 430, and an image processing circuit 440 assembled in turn.

In the embodiment, the image processing circuit 440 converts the format of the display signals from the signal source, and outputs the consented display signals to the V-by-One circuit 430. The image processing circuit 440 converts the refresh rate of the display and converts the color variation to be multi-bit image data.

The V-by-One circuit 430 is the display signal processing circuit capable of selecting the JEIDA mode and the VESA mode. The V-by-One circuit 430 includes a signal input 431, a signal output 432 and a GPIO 433. The GPIO 433 electrically connects to a first resistor (R5) and a second resistor (R6). A first end of the first resistor (R5) is grounded. A second end of the first resistor (R5) connects to a first end of the second resistor (R6) and the GPIO 433. A second end of the second resistor (R6) connects to a power source 434. The power source 434 may be an external power source, or a power source arranged on a circuit board 225 of the display signal processing system 200. It is to he noted that the first resistor (R5), the second resistor (R6) and the V-by-One circuit 430 are arranged on the same circuit hoard (A). It is to be noted that the first resistor (R5), the second resistor (R6), the timing control circuit 420, and the V-by-One circuit 430 are assembled on one PCB. In addition, the image processing circuit. 440 is arranged on another PCB.

The signal input 431 connects to the I2C bus of the image processing circuit 440 so as to input the converted display signals.

When a first LVDS signal has to be output by the V-by-One circuit 430 under the JEIDA mode, the GPIO 443 enters an input state. A processing unit within the liquid crystal display 400 controls the power source 434 such that the GPIO 433 is controlled by the power source 434 to generate a first selection signal. Under the circumstance, the output current is increased and the high potential is connected so that the GPIO 433 is the pullup resistor. At this moment, as being driven by the pullup resistor of the GPIO 433, the V-by-One circuit 430 further converts the display signals to be the first LVDS signal. Afterward, the first LVDS signal is output via the signal output 432 so that the display panel is capable of receiving and displaying the images.

When a second LVDS signal has to be output by the V-by-One circuit 430 under the VESA mode, the GPIO 433 enters the input state. The processing unit within the liquid crystal display 400 controls the power source 434 such that the GPIO 433 is controlled by the power source 434 to generate a second selection signal. Under the circumstance, the output current is decreased and the low potential is connected so that the GPIO 433 is a pulldown resistor. At this moment, as being driven by the pulldown resistor of the GPIO 433, the V-by-One circuit 220 further converts the display signals to be the second LVDS signal. Afterward, the first LVDS signal is output via the signal output 432 so that the display panel is capable of receiving and displaying the images.

In the embodiment, the first selection signal and the second selection signal are voltage signals. In addition, the voltage of the first selection signal is higher than the voltage of the second selection signal. In other embodiment, the first selection signal and the second selection signal are the power signal or the current output signal. Correspondingly, the magnitude of power or the current value of the first selection signal is larger than that of the second selection signal. In addition, the first LVDS signal or the second LVDS signal output by the signal output 432 is received and processed by the timing control circuit 420, and then is received by a driving circuit 411 of the display panel 410. As such, the driving circuit 411 drives the display panel 410 to display corresponding images.

In view of the above, the liquid crystal display 400 not only has a high-frequency signal transmission rate, but also simplifies the selection of the VESA and the JEIDA mode of the V-by-One circuit. In addition, the liquid crystal display 400 retains the advantages of lower cost and simple operations.

It is believed that the present embodiments and their advantages will be understood from the foregoing, description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display signal processing system, comprising:
a V-by-One circuit capable of selecting a JEIDA mode and a VESA mode;
an image processing circuit for converting a format of display signals from a signal source, and for outputting the converted display signals to the V-by-One circuit; and
the V-by-One circuit comprises a signal input for connecting the image processing circuit to input the converted display signals, signal output, and a GPIO for selectively inputting a first or a second selection signal such that the V-by-One circuit transforms the converted display signal to be a first LVDS signal under the JEIDA mode or a second LVDS under the VESA mode, and then the first LVDS or second LVDS signal is output by the signal output, the first selection signal and the second selection signal are voltage signals, and the voltage of the first selection signal is higher than the voltage of the second selection signal; and
wherein the system further comprises a first resistor and a second resistor, a first end of the first resistor is grounded, a second end of the first resistor connects to a first end of the second resistor and the GPIO, a second end of the second resistor connects to a power source such that the GPIO is controlled by the power source to generate the first or the second selection signal.

2. The display signal processing system as claimed in claim 1, wherein the V-by-One circuit, the first resistor, and the second resistor are arranged on the same printed circuit board (PCB).

3. The display signal processing system as claimed in claim 1, wherein the signal input of the V-by-One circuit connects to an I2C bus of the image processing circuit.

4. A circuit board, comprising:
a V-by-One chip capable of selecting a JEIDA mode and a VESA mode, the V-by-One circuit comprises a signal input for connecting the image processing circuit to input converted display signals, a signal output, and a GPIO for selectively inputting a first or a second selection signal such that the V-by-One circuit transforms the converted display signal to be a first LVDS signal under the JEIDA mode or a second LVDS under the VESA mode, and then the first LVDS or second LVDS signal are output by the signal output, the first selection signal and the second selection signal are voltage signals, and the voltage of the first selection signal is higher than the voltage of the second selection signal; and
wherein the circuit board further comprises a first resistor and a second resistor, a first end of the first resistor is grounded, a second end of the first resistor connects to a first end of the second resistor and the GPIO, a second end of the second resistor connects to a power source such that the GPIO is controlled by the power source to generate the first or the second selection signal.

5. A liquid crystal display, comprising:
a display panel, a timing control circuit, a V-by-One circuit, and an image processing circuit assembled in turn, the V-by-One circuit is a display signal processing circuit capable of selecting a JEIDA mode and a VESA mode, and the image processing circuit converts a format of display signals from a signal source, and outputs the converted display signals to the V-by-One circuit;
the V-by-One circuit comprises a signal input for connecting the image processing circuit to input the converted display signals, a signal output, and a GPIO for selectively inputting a first or a second selection signal such that the V-by-One circuit transforms the converted display signal to be a first LVDS signal under the JEIDA mode or a second LVDS under the VESA mode, and then the first LVDS or second LVDS signal are output by the signal output; and
wherein the first selection signal and the second selection signal are voltage signals, and the voltage of the first selection signal is higher than the voltage of the second selection signal; and
the display signal processing circuit further comprises a first resistor and a second resistor, a first end of the first resistor is grounded, a second end of the first resistor connects to a first end of the second resistor and the GPIO, a second end of the second resistor connects to a power source such that the GPIO is controlled by the power source to generate the first or the second selection signal.

6. The liquid crystal display as claimed in claim 5, wherein the V-by-One circuit, the first resistor, and the second resistor are arranged on the same PCB, and the image processing circuit is arranged on another PCB.

7. The liquid crystal display as claimed in claim 5, wherein the display panel further comprises a driving circuit connecting to the timing control circuit, and the driving circuit receives the first or the second LVDS signal from the timing control circuit so as to drive the display panel to display corresponding images.

8. The liquid crystal display as claimed in claim 5, wherein the signal input of the V-by-One circuit connects to an I2C bus of the image processing circuit.

9. The circuit board as claimed in claim 4, wherein the V-by-One circuit, the first resistor, and the second resistor are arranged on the same printed circuit board (PCB).

10. The circuit board as claimed in claim 4, wherein the signal input of the V-by-One circuit connects to an I2C bus of the image processing circuit.

* * * * *